INVENTOR.
NOEL DAVIS
BY
Meyer, Tilberry & Body
ATTORNEYS

United States Patent Office 3,393,728
Patented July 23, 1968

3,393,728
COOLING ARRANGEMENT FOR ENVIRONMENTAL GROWTH CHAMBER LIGHTING SYSTEMS
Noel Davis, Russell Township, Geauga County, Ohio, assignor to Integrated Development and Manufacturing Co., Chagrin Falls, Ohio, a corporation of Ohio
Filed July 21, 1966, Ser. No. 566,991
9 Claims. (Cl. 165—48)

ABSTRACT OF THE DISCLOSURE

A light cap structure for use on environmental growth chambers and the like. The structure includes a lamp chamber with a plurality of closely spaced electric lamps positioned therein, and a superposed cooling chamber provided with means for cooling air passed therethrough. The lamp chamber and the cooling chamber are in direct communication and fans are provided for continuously recirculating air in a closed path through the lamp chamber and the cooling chamber.

This invention is directed to the art of environmental growth chambers and, more particularly, to an improved light cap arrangement therefor.

Environmental growth chambers are generally well-insulated housing structures provided with means to maintain a closely controllable environment therein. These chambers are normally used in biological research. Experiments for such studies as photosynthesis, nutrition-tracer, metabolism, plant diseases, breeding and genetics, and environment variability are often carried out in these chambers.

Since living things sense all of the variables in their environment, the growth chamber must produce a synthetic, uniform, and controllable climate. It must be capable of very closely controlling such variables as temperature, humidity, air flow and of providing very high light intensities on the order of 8–11,000 lumens per square foot or higher if possible.

In general, a typical environmental growth chamber comprises a well-insulated chamber structure provided with insulated access openings. Variables such as temperature, humidity, and air flow within the growth chamber are normally controlled by apparatus mounted on the sidewalls of the growth chamber. These sidewalls extend upwardly, terminating in a large opening for receiving a light cap. The light cap fits over this opening and includes a large number of closely spaced fluorescent lamps which generate the necessary high intensity light for the growth chamber. A sheet of clear plastic closes the opening of the chamber and separates the lights therefrom.

Because of the large number of fluorescent lamps used, a large amount of heat is generated which must be removed. In some of the larger growth chambers the heat that must be removed amounts to over 10,000 watts per chamber. Some large installations involve as many as 20 chambers in one room. Heretofore, this heat was removed by drawing or blowing air from the surrounding room over the lamps. One such installation would have required vent ducts seven feet square.

Also, because of the large volume of air, dust from the surrounding room being pulled in and deposited in the light cap presented a problem. This dust tended to clog the blower motors and deposit on the plastic barrier, reducing the efficiency of the light cap. Also, because of the duct openings from the light cap to the surrounding room, problems were had with insects entering the light cap and infiltrating into the growth chamber.

Another problem was that of external light, e.g., daylight, seeping into the chamber through the duct work. Such light is often very detrimental to carefully controlled experiments.

Additionally, research work leading to the present invention indicated that there appeared to be a variation in the light intensity from day to day even though the voltage supplied to the lamps remained exactly the same. Further research finally indicated that the light intensity varied with the room temperature and that the cause of the light intensity variation was due to variations in the temperature of the fluorescent lamp bulbs caused by variations in the temperature of the cooling air impinging on the bulbs.

The present invention overcomes the above problems and provides a completely sealed cooling arrangement for a light cap. This arrangement enables the light cap to produce light of uniform intensity over prolonged periods of time. Additionally, it permits a higher light intensity to be obtained from a given set of lamps than heretofore thought possible.

In accordance with the present invention, the lamps are mounted in a closed cabinet and cooling air is continuously recirculated through a cooling coil and then blown against the lamps at a substantially constant temperature. This temperature is chosen so that considering the variation of light output with temperature, the maximum light output may be obtained.

Further, in accordance with the present invention, heat conducting means are mounted on the bulb of each lamp and the cooling air is directed against such heat conducting means.

The primary object of the present invention is the provision of a substantially airtight light cap adapted to continuously produce light of high and uniform intensity.

Another object of the present invention is the provision of a light cap cooling arrangement in which each of the fluorescent lamps in the light cap is maintained at its optimum temperature, to thereby produce light of constant uniformity and high intensity.

Another object of the invention is the provision of a cooling fin on a fluorescent lamp in a light cap so that a controlling portion of the lamp may be more easily maintained at the optimum operating temperature with a higher temperature of cooling air.

A further object of the present invention is the provision of a cooling arrangement for a light cap of a growth chamber which is completely sealed relative the air ambient the growth chamber.

A still further object of the present invention is the provision of a cooling arrangement for a light cap of a growth chamber which permits a substantial reduction in the size of the cooling connections.

Another object of the present invention is the provision of a cooling arrangement for the light cap of a growth chamber which permits the light cap end of the growth chamber to be completely sealed against the infiltration of dust and insects.

Yet another object of the present invention is the provision of a cooling fin for fluorescent lamps which can be manufactured cheaply and simply.

These and other objects or advantages will become apparent from the following description used to illustrate the preferred embodiment of the invention as read in connection with the accompanying drawings in which.

Figure 1:
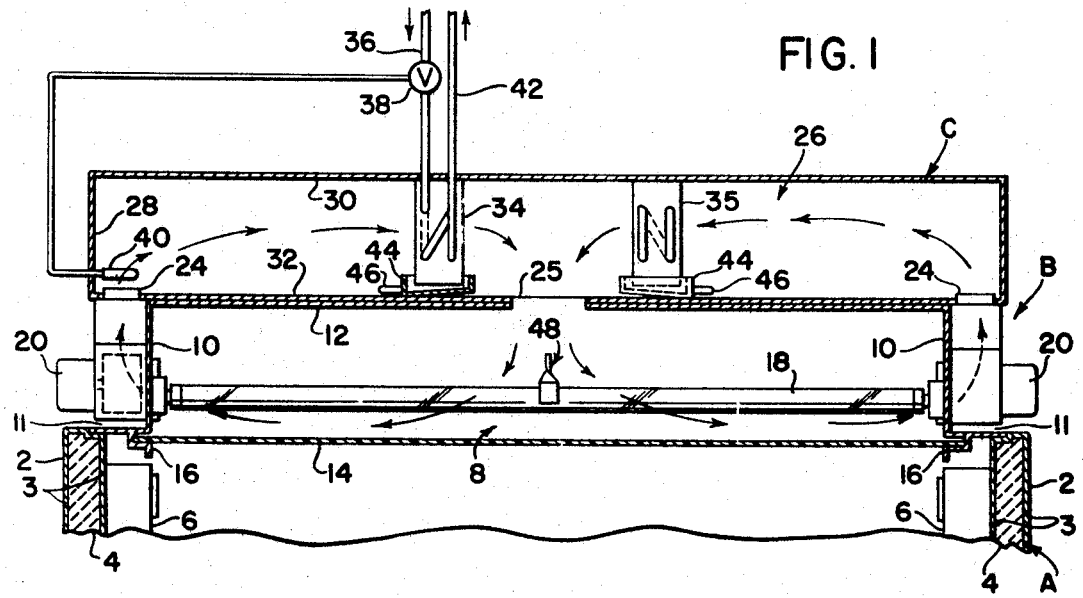
FIGURE 1 is a cross-sectional view taken through the upper portion of an environmental growth chamber having a light cap with a cooling arrangement constructed according to the preferred embodiment of the present invention installed thereon.

Referring now to the drawings wherein the showings are for the purpose of illustrating a preferred embodiment of the invention only and not for the purpose of limiting same, FIGURE 1 shows a conventional overall arrangement of the environmental growth chamber A with light cap B positioned across the top thereof. A cooling arrangement C constructed in accordance with the invention is positioned on top of light cap B.

Environmental growth chamber A forms no part of the present invention and includes upstanding walls 2 and temperature and humidity modifying devices 6. Walls 2 are formed, for example, from two sheets of polished aluminum 3 bonded to a core of polystyrene foam insulation 4. Positioned across the upper end of the environmental growth chamber A is light cap B.

Light cap B includes a lower lamp chamber 8. Lamp chamber 8 is of generally rectangular cross-section and is formed by side walls 10, upper wall or baffle 12, and lower wall 14. The lower wall 14 of the chamber 8 is comprised of a transparent barrier formed of material such as "Plexiglas" mounted on flanges 16 which extend completely around the lower end of the chamber. This barrier serves to partially insulate the interior of the environmental growth chamber from the heat generated by the lamps present in chamber 8. Horizontally positioned within chamber 8 are a plurality of closely spaced fluorescent lamps 18. Fluorescent lamps 18 produce the high intensity light required for conducting biological experiments in environmental growth chamber A. Generally, these lamps must provide a light intensity of at least 3000 foot candles in the lower portion of environmental growth chamber A.

Figure 2:
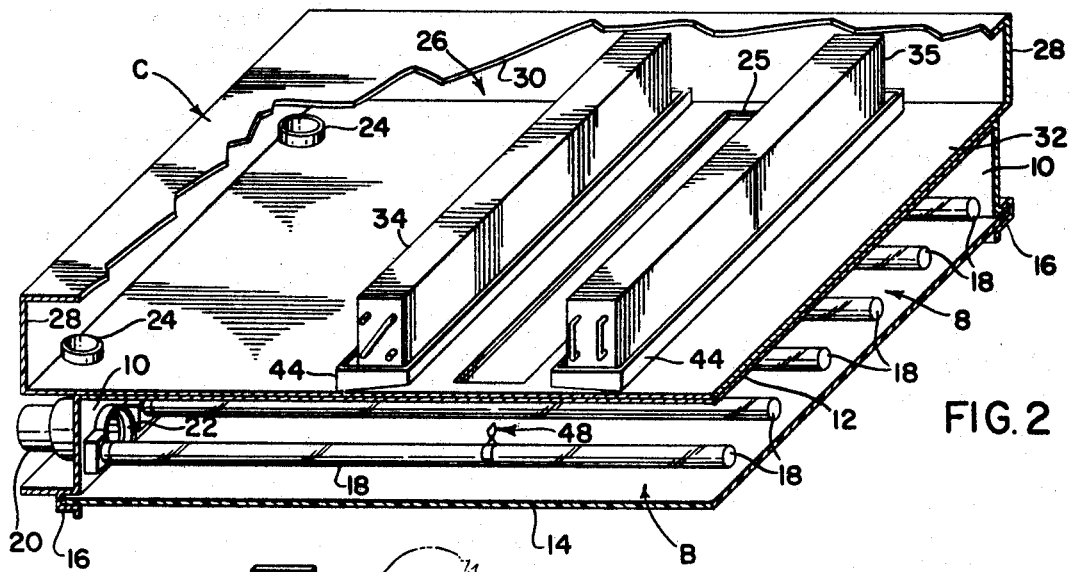
FIGURE 2 is a pictorial view of a light cap with a cooling arrangement constructed according to the preferred embodiment of the present invention and having a portion cut away to show in detail the internal features of the light cap; and, FIGURE 3 is a pictorial view of one of the features of the present invention.

The cooling arrangement C is positioned immediately above light chamber 8 and is comprised of cooling plenum 26, which can be constructed integrally with lamp chamber 8 as a unitary structure or made separate and attached to existing lamp chambers or light caps. As shown in FIGURES 1 and 2, cooling plenum 26 is sealed relative the ambient air and comprises a generally rectangular box-shaped structure formed by side walls 28, a top wall 30 and a lower wall or baffle 32. Cooling plenum 26 is in communication with light chamber 8 through fan chambers 11 positioned at opposite ends of light chamber 8. Further communication is provided between light chamber 8 and cooling plenum 26 by opening 25 which extends substantially the entire width of the light chamber 8. This opening serves to direct substantially all the air coming from cooling plenum 26 directly down against a relatively limited area of each of the lamps in light chamber 8.

Positioned within the cooling plenum 26 on opposite sides of opening 25 and closely adjacent thereto are heat exchangers 34 and 35. Heat exchangers 34 and 35 are comprised of sinuously bent tubes covered with heat exchange fins. It should be noted that these heat exchangers are of a size to substantially fill the vertical cross-sectional area of plenum 26. This causes all of the air flowing through the plenum to pass through the heat exchangers. Alternatively, it would be possible to use slightly smaller heat exchangers providing that sufficient baffling was provided to ensure the proper flow of air through the heat exchangers and into the lower chamber 8. Shown connected to the heat exchanger 34 are coolant inlet and return lines 36 and 42, respectively. Similar coolant inlet and return lines, not shown, are provided for heat exchanger 35.

Coolant is supplied to the heat exchangers from any convenient source of coolant.

Also positioned in plenum chamber 26 are condensation collection pans 44. These pans are positioned directly beneath heat exchangers 34 and 35 so as to collect any moisture which condenses from the air passing over the heat exchangers. Moisture which collects in these pans is conducted to a location exterior of the light cap by drain line 46.

Means are further provided to produce a closed, continuously recirculating flow of air through lamp chamber 8 and cooling plenum 26. These means comprise a plurality of fans 20 positioned in fan chambers 11 at opposite ends of light chamber 8. These fans can be of any type capable of producing an adequate recirculation of air through the light cap. In the preferred embodiment, however, they are shown as standard electric motor driven radial-flow fans. Each of the fans 20 is positioned so that its inlet 22 is in the side wall at the end of lamp chamber 8 and its outlet 24 is in the bottom 32 of plenum 26. Thus, as shown by the arrows in FIGURE 1, air is continuously withdrawn from the opposite ends of lamp chamber 8, from there it is passed upwardly into the ends of cooling plenum 26 where it then passes across heat exchangers 34 and 35 and is cooled to the proper temperature, prior to passing back into light chamber 8 through opening 25.

The flow of coolant through the heat exchangers 34 and 35 is controlled by a temperature responsive modulating valve 38 positioned in inlet line 36. Modulating valve 38 can be any type of temperature responsive modulating valve such as the standard fluid-filled temperature sensing valves currently available. As shown in the preferred embodiment, valve 38 is controlled in response to temperatures sensed by bulb 40 positioned at one of the fan outlets 24 of light chamber 8. This particular location for sensing bulb 40 is preferred because the air velocity is highest at this point. This results in better heat transfer between the bulb and the air, and consequently, more rapid response to temperature changes within the light cap. However, it is apparent that the bulb could be positioned at other locations in the light cap. Thus, it can be seen that in the preferred embodiment, flow of coolant through the heat exchangers is continuously modulated in response to the temperature of the air leaving light chamber 8.

Figure 3:
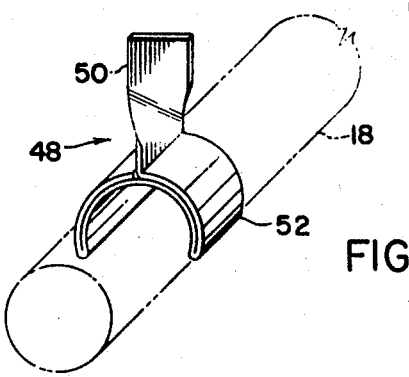

In accordance with the invention, heat exchange means are provided on the lamps to improve the transfer of heat from the lamps to the air and to maintain at least a certain limited area of the lamps at a desired predetermined temperature. These heat exchange means may take many forms, such as metal sleeves or wire wrappings on a portion of the lamps; however, in accordance with the preferred embodiment, these means comprise a heat exchange fin 48 positioned on each lamp 18 at a location immediately below opening 25. Heat exchange fins 48 are preferably formed from a highly heat conducting material such as aluminum. As best shown in FIGURE 3, each of the cooling fins 48 comprises a clip portion 52 and a fin portion 50. Clip portion 52 is bent so as to grip tightly around the fluorescent lamps 18 in good heat conducting relationship thereto. Portion 50 extends upwardly from clip portion 52 and is twisted about its longitudinal axis at an angle of approximately 90°. Referring to FIGURES 1 and 2, it can be seen that by thus twisting fin 50, the major surface thereof is positioned to be impinged by the cool air entering light chamber 8.

The light output of fluorescent lamps is a function of the temperature of the coldest spot on the lamp bulb. Generally, the output of a fluorescent lamp increases with an increase in temperature up to a temperature at which a maximum output is reached. Further temperature increases causes the output to drop. While it may be that the temperature at which maximum output occurs will be different if bulbs of a type other than those employed in the present invention are used, those used herein exhibit a maximum output intensity when their coldest spot is at a temperature of 104 to 105° F. Thus, the use of fins 48 at a location immediately below opening 25 assures that the cold spot on each lamp will be at substantially the same temperature, that is, at a temperature slightly above the temperature of the air entering the light chamber 8 through opening 25. Further, by controlling the temperature of the air passing into the light chamber over fins 48, it is possible to maintain the cold spot at a temperature of 104 to 105° F. thus operating the lamps 18 at their most efficient point to produce the maximum light at uniform intensity. It has been found that by use of fins 48 the temperature of the coolant supplied to heat exchangers 34 and 35 can be at 5° hotter than would be permissible without the use of the fins.

In view of the above description, it is apparent that a light cap construction has been provided which overcomes the problems of prior art light cap constructions, and provides a light cap which produces light of high intensity and constant uniformity.

Because of the design of the subject light cap, coolant as hot as 85° F. can be used and the lamps maintained at the desired temperature of 104 to 105° F. This offers economies in operation since it is not necessary to supply chilled coolant, but rather, the coolant can be readily available domestic water or water taken from the local cooling tower water system used for cooling air compressors and other machinery. However, chilled coolant could obviously be used.

As an example of the advantages to be obtained by the use of the present invention, a light cap with a cooling arrangement constructed according to the present invention was installed on a growth chamber. Prior to regulating the cooling air temperature to the desired point, a maximum light output of 4500 foot candles was obtained. However, after adjusting the cooling air temperature to the desired point, a constant light output intensity of 6000 foot candles was obtained. Also, a battery of 20 growth chambers each having an electrical power input on the order of 15,000 watts required only a two inch diameter water pipe to a cooling tower. Thus, it is apparent that the present invention offers a very real and substantial improvement over the prior art light caps.

The invention has been described sufficiently to enable one skilled in the art of environmental growth chambers to duplicate the invention. Obviously modifications and alterations of the preferred embodiment described will occur to others upon reading and understanding this specification. It is my intention to include all such modifications and alterations as part of my invention insofar as they come within the scope of the appended claims.

Having thus described my invention, I claim:

1. In an environmental growth chamber having means for maintaining predetermined conditions of temperature, humidity and air flow therein, a light cap positioned over said chamber and sealed therefrom, and having a plurality of fluorescent lamps positioned therein, the improvement comprising: means defining a closed cooling chamber, means in said cooling chamber for cooling the air passed therethrough to a selected temperature; means providing direct air flow communication between said cooling chamber and said lamp chamber and fan means for providing a continuous recirculation of air through said lamp chamber to said cooling chamber and back to said lamp chamber, which air flow is separate from the air flow in said growth chamber.

2. The improvement as defined in claim 1 wherein said means providing direct communication between said lamp chamber and said cooling chamber communicates all of the air passed through said cooling chamber directly back to said lamp chamber.

3. The improvement as defined in claim 1 wherein said cooling chamber is superposed relative to said lamp chamber and said means providing communication between said lamp chamber and said cooling chamber includes a first opening generally centrally of said lamp chamber and second openings on opposite ends of said lamp chamber.

4. The improvement as defined in claim 1 including means responsive to the temperature of the air passing through said lamp chamber for controlling said cooling means independent of the temperature within said growth chamber.

5. The improvement as defined in claim 3 including heat conducting fin means positioned on said lamps on a portion thereof directly beneath said first opening.

6. In an environmental growth chamber having a light cap including a plurality of closely spaced fluorescent lamps therein, the improvement comprising: means to continuously recirculate air over the lamps in said lamp chamber and means to cool the temperature of said air to a desired predetermined temperature prior to its being passed over said lamp; said light cap further comprising substantially flat top, bottom and side walls defining said lamp chamber with said fluorescent lamps horizontally positioned in said chamber; means superposed relative said lamp chamber and defining a cooling plenum with a means to modify the temperature of said air comprising air cooling means positioned therein; means communicating said lamp chamber and said cooling plenum and in which the means to circulate air over the lamps comprises means for continuously recirculating air through said cooling plenum in said lamp chamber and means to direct substantially all of the air coming through said cooling chamber directly against a relatively limited area of each of said lamps, said cooling means comprising a heat exchange coil having cooling fluid at a relatively constant temperature circulated therethrough.

7. A light cap defined in claim 6 wherein each of said lamps has heat exchange fin means mounted thereon at a location within said relatively limited area.

8. In an environmental growth chamber having a light cap including a plurality of closely spaced fluorescent lamps therein, the improvement comprising: means to continuously recirculate air over the lamps in said lamp chamber and means to cool the temperature of said air to a desired predetermined temperature prior to its being passed over said lamps; said light cap further comprising substantially flat top, bottom and side walls defining a lamp chamber, said fluorescent lamps horizontally positioned in said chamber; means superposed relative said lamp chamber and defining a cooling plenum with the means to modify the temperature of said air comprising air cooling means positioned therein; means communicating said lamp chamber and said cooling plenum and in which the means to circulate air over the lamps comprises means for continuously recirculating air through said cooling plenum in said lamp chamber and means to direct substantially all of the air coming through said cooling chamber directly against a relatively limited area of each of said lamps, said means defining said cooling plenum including a bottom wall generally parallel with the top wall of said lamp chamber, a top wall spaced from said bottom wall, and side walls connecting the top and bottom walls of said cooling plenum, and wherein said means for continuously recirculating air through said lamp chamber includes a plurality of fans connected between said lamp chamber and said plenum, said fans positioned so as to withdraw air from opposite ends of said lamp chamber and pass it into opposite ends of said plenum; and wherein said means to direct air directly against a limited area of each of said lamps comprises an elongated opening formed in a central portion of the bottom wall of said plenum and connected with a corresponding opening formed in the top wall of said lamp chamber.

9. A light cap as defined in claim 8 wherein said cooling means comprise cooling coils positioned in said plenum along opposite sides of said elongated opening, and including means to regulate the flow of coolant through said coils.

References Cited

UNITED STATES PATENTS

| | | | |
|---|---|---|---|
| 3,114,505 | 12/1963 | Kennedy | 98—40 |
| 3,193,001 | 7/1965 | Meckler | 165—27 |
| 3,326,112 | 6/1967 | Sadlow et al. | 98—40 |

ROBERT A. O'LEARY, *Primary Examiner.*

CHARLES SUKALO, *Assistant Examiner.*